United States Patent
Saito

(10) Patent No.: US 12,043,302 B2
(45) Date of Patent: Jul. 23, 2024

(54) SCREW SHAFT AND METHOD FOR MANUFACTURING SAME, AND ELECTRIC POSITION ADJUSTING DEVICE FOR STEERING WHEEL AND METHOD FOR MANUFACTURING SAME

(71) Applicant: NSK Ltd., Tokyo (JP)

(72) Inventor: Takeshi Saito, Maebashi (JP)

(73) Assignee: NSK Ltd., Tokyo (JP)

( * ) Notice: Subject to any disclaimer, the term of this patent is extended or adjusted under 35 U.S.C. 154(b) by 640 days.

(21) Appl. No.: 17/267,266

(22) PCT Filed: Jul. 17, 2019

(86) PCT No.: PCT/JP2019/028104
§ 371 (c)(1),
(2) Date: Feb. 9, 2021

(87) PCT Pub. No.: WO2020/031637
PCT Pub. Date: Feb. 13, 2020

(65) Prior Publication Data
US 2021/0309278 A1 Oct. 7, 2021

(30) Foreign Application Priority Data

Aug. 10, 2018 (JP) .................................. 2018-151671
Dec. 17, 2018 (JP) .................................. 2018-235095

(51) Int. Cl.
*B62D 1/181* (2006.01)
*B21H 3/04* (2006.01)
*F16H 25/24* (2006.01)

(52) U.S. Cl.
CPC ............... *B62D 1/181* (2013.01); *B21H 3/04* (2013.01); *B21H 3/046* (2013.01); *F16H 25/24* (2013.01)

(58) Field of Classification Search
CPC .......... B62D 1/181; B21H 3/046; B21H 3/04; F16H 25/24
(Continued)

(56) References Cited

U.S. PATENT DOCUMENTS 8,991,861 B1 * 3/2015 Iwakawa ................ B62D 1/181
74/495
11,041,521 B2 * 6/2021 Saito ........................ F16B 37/00
(Continued)

FOREIGN PATENT DOCUMENTS

CN 103562047 B 4/2016
JP 9-225573 A 9/1997
(Continued)

OTHER PUBLICATIONS

JP 2007111740 A, Method for Forming Screw Thread and Screw Thread in Ball Screw Thread, Horikoshi Manabu, Translation and Original Doc (Year: 2007).*
(Continued)

*Primary Examiner* — Amy R Weisberg
*Assistant Examiner* — Caitlin Anne Miller
(74) *Attorney, Agent, or Firm* — Crowell & Moring LLP

(57) ABSTRACT

A screw shaft includes a large-diameter shaft portion having a male-side screw portion over the entire length of the outer circumferential surface thereof; a first small-diameter shaft portion arranged adjacent to one side in the axial direction of the large-diameter shaft portion, and having an outer diameter that is smaller than the outer diameter of the large-diameter shaft portion, and having a helical first rolling mark on the outer circumferential surface thereof; and a second small-diameter shaft portion arranged adjacent to the other side in the axial direction of the large-diameter shaft portion, and having an outer diameter that is smaller than the outer diameter of the large-diameter shaft portion, and
(Continued)

having a helical first rolling mark on the outer circumferential surface thereof.

17 Claims, 10 Drawing Sheets

(58) Field of Classification Search
USPC .................................. 280/755; 74/493, 89.23
See application file for complete search history.

(56) References Cited

U.S. PATENT DOCUMENTS

| | | | |
|---|---|---|---|
| 2015/0090067 A1* | 4/2015 | Iwakawa | B62D 1/181 74/493 |
| 2021/0220901 A1 | 7/2021 | Kitamura et al. | |

FOREIGN PATENT DOCUMENTS

| | | | | |
|---|---|---|---|---|
| JP | 2003-33841 | A | 2/2003 | |
| JP | 2005-199760 | A | 7/2005 | |
| JP | 2006-321484 | A | 11/2006 | |
| JP | 2007111740 | A * | 5/2007 | |
| JP | 2008-281142 | A | 11/2008 | |
| JP | 2010-208440 | A | 9/2010 | |
| JP | 2015-227166 | A | 12/2015 | |
| WO | WO-2015129163 | A1 * | 9/2015 | ......... F16H 25/2204 |
| WO | WO 2019/176334 | A1 | 9/2019 | |
| WO | WO-2022080331 | A1 * | 4/2022 | |

OTHER PUBLICATIONS

International Search Report (PCT/ISA/210) issued in PCT Application No. PCT/JP2019/028104 dated Oct. 21, 2019 with English translation (four (4) pages).
Japanese-language Written Opinion (PCT/ISA/237) issued in PCT Application No. PCT/JP2019/028104 dated Oct. 21, 2019 (four (4) pages).
Chinese-language Office Action issued in Chinese Application No. 201980053134.0 dated Jun. 21, 2022 with English translation (20 pages).
German-language Office Action issued in German Application No. 11 2019 004 027.8 dated May 7, 2024 with English translation (15 pages).

* cited by examiner

FIG.2A
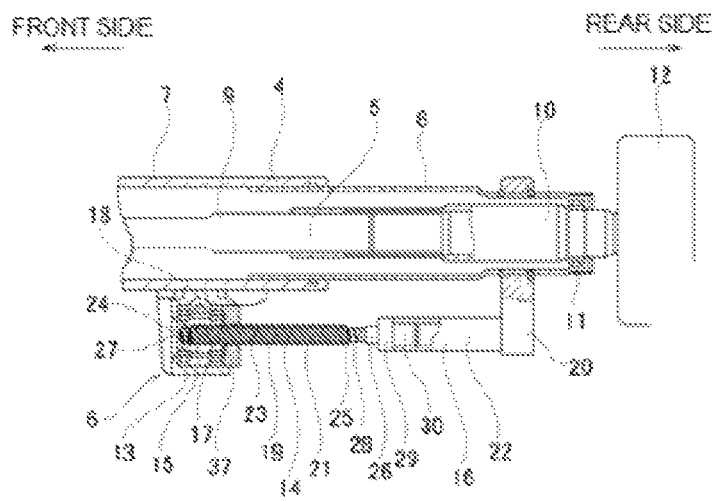
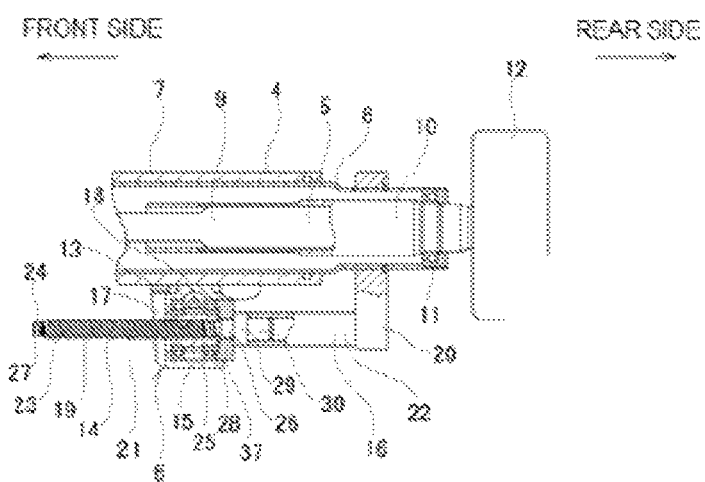
FIG.2B

SCREW SHAFT AND METHOD FOR MANUFACTURING SAME, AND ELECTRIC POSITION ADJUSTING DEVICE FOR STEERING WHEEL AND METHOD FOR MANUFACTURING SAME

TECHNICAL FIELD

, and an electric position adjusting device for a steering wheel including an electric motor and a feed screw mechanism and a manufacturing method thereof.

BACKGROUND ART

Various electric position adjusting devices for a steering wheel capable of adjusting the front-rear position and the height position of a steering wheel by using an electric motor as a drive source are known (for example, refer to JP 2005-199760A, JP 2006-321484A, JP 2015-227166A).

A feed screw mechanism is widely used as a mechanism incorporated in various mechanical devices including devices such an electric position adjusting device for a steering wheel for converting the rotational motion of a drive source into a linear motion. A feed screw mechanism includes a screw shaft having a male-side screw portion on the outer circumferential surface and a nut having a female-side screw portion on the inner circumferential surface.

Feed screw mechanisms include slide screw type feed screw mechanisms and ball screw type feed screw mechanisms. In a slide screw type feed screw mechanism, the male-side screw portion of the screw shaft and the female-side screw portion of the nut are engaged with each other. In a ball screw type feed screw mechanism, the male-side screw portion of the screw shaft forms a male screw groove, the female-side screw portion of the nut forms a female screw groove, and a plurality of balls are arranged between the male screw groove and the female screw groove.

In either of these feed screw mechanisms, the male-side screw portion of the screw shaft may be formed by rolling. In the rolling process of the male-side screw portion, the work, which is an intermediate blank of the screw shaft, is rolled between a plurality of rolling dies, and the outer circumferential surface of the work is plastically deformed by these rolling dies to form the male-side screw portion.

In the rolling process of the male-side screw portion, there is a method in which walking occurs that is a phenomenon in which the work moves in the axial direction with respect to the rolling dies (refer, for example, to JP 2003-033841A, JP 2008-281142A).

CITATION LIST

Patent Literature

[Patent Literature 1] JP 2005-199760A
[Patent Literature 2] JP 2006-321484A
[Patent Literature 3] JP 2015-227166A
[Patent Literature 4] JP 2003-033841A
[Patent Literature 5] JP 2008-281142A

SUMMARY OF INVENTION

Technical Problem

In the rolling process of the male-side screw portion of the method in which a walking occurs that is described in JP 2003-033841A, JP 2008-281142A, and the like, there is room for improvement from the aspect of improving the machining accuracy of the male-side screw portion. Hereinafter, this will be described with reference to FIG. 10.

FIG. 10 illustrates a part of a step of forming the male-side screw portion 3 on the outer circumferential surface of the large-diameter portion of the work 1 by this kind of rolling process. Note that the number of rolling dies 2 used at this time is two or more (a plurality); however, in FIG. 10, only one of them is illustrated. More specifically, as illustrated in FIGS. 10A and 10B, while rolling the work 1 between the plurality of rolling dies 2, walking, which is movement of the work 1 in the axial direction, is allowed to occur, the male-side screw portion 3 is formed by plastically deforming the outer circumferential surface of the large-diameter portion of the work 1 with a plurality of rolling dies 2. FIG. 10B illustrates a state in which the work 1 is allowed to walk to a position where the end portion on one side in the axial direction of the rolling dies 2 deviates from the outer circumferential surface of the large-diameter portion of the work 1 in order to form the male-side screw portion 3 up to the edge of the end portion on one side in the axial direction (right side in FIGS. 10A to 10C) of the large-diameter portion of the work 1.

When the positional relationship between the work 1 and the rolling dies 2 changes as illustrated in FIGS. 10A and 10B, the rolling load that acts between the end portion of the rolling die 2 on the one side in the axial direction and the large-diameter portion in the state illustrated in FIG. 10A is lost in the state illustrated in FIG. 10B, so a large change occurs in the distribution of the rolling load that acts between the rolling die 2 and the work 1. As illustrated in FIG. 10C, due to the change in the amount of elastic deformation of the rolling machine that supports the rolling dies 2 and the work 1, there is a tendency for relative displace such as inclination or the like to occur between the rolling dies 2 and the work 1 by an amount corresponding to this change. As a result, the machining precision of the end portion on the one side in the axial direction of the male-side screw portion 3 formed on the large-diameter portion of the work 1 is lowered. Such a problem similarly occurs at the end portion of the other side in the axial direction of the male-side screw portion 3 (not illustrated in FIGS. 10A to 10C).

When the machining precision is lowered in this way, it becomes difficult to make both end portions in the axial direction of the male-side screw portion 3 function as a normal male-side screw portion, and a problem occurs in that the operating stroke of the feed screw mechanism is shortened accordingly.

An object of the present invention is to provide an electric position adjusting device for a steering wheel that includes a screw shaft having good machining precision on both end portions in the axial direction of the male-side screw portion, an electric motor, and a feed screw mechanism, wherein the operating stroke of the feed screw mechanism is sufficiently maintained.

Solution to Problem

The screw shaft of the present invention includes a large-diameter shaft portion, and a small-diameter shaft portion.

The large-diameter shaft portion has a male-side screw portion over an entire length of an outer circumferential surface thereof.

The small-diameter shaft portion is arranged adjacent in an axial direction to the large-diameter shaft portion, has an outer diameter that is smaller than an outer diameter of the large-diameter shaft portion, and has a helical rolling mark on an outer circumferential surface thereof that is in phase with an extension line of a spiral curve that is a root circle line of the male-side screw portion.

Preferably, in the screw shaft of the present invention, the outer diameter of the small-diameter shaft portion is no less than 0.9 times and no more than 1.1 times the root circle diameter of the male-side screw portion.

The screw shaft of the present invention may include an adjacent shaft portion that is arranged adjacent to the small-diameter shaft portion on a side in the axial direction opposite to the large-diameter shaft portion, and have an outer diameter larger than the outer diameter of the small-diameter shaft portion.

In the screw shaft of the present invention, the small-diameter shaft portion may include a first small-diameter shaft portion arranged on one side in the axial direction of the large-diameter shaft portion; and a second small-diameter shaft portion arranged on the other side in the axial direction of the large-diameter shaft portion. More specifically, in this case, the first small-diameter shaft portion is arranged adjacent to the one side in the axial direction of the large-diameter shaft portion, has an outer diameter that is smaller than the outer diameter of the large-diameter shaft portion, and has a helical first rolling mark on the outer circumferential surface thereof that is in phase with an extension line of a helical curve that is the root circle line of the male-side screw portion; and the second small-diameter shaft portion is arranged adjacent to the other side in the axial direction of the large-diameter shaft portion, has an outer diameter that is smaller than the outer diameter of the large-diameter shaft portion, and has a helical second rolling mark on the outer circumferential surface thereof that is in phase with an extension line of the helical curve.

Preferably, in the screw shaft of the present invention, both the outer diameter of the first small-diameter shaft portion and the outer diameter of the second small-diameter shaft portion are no less than 0.9 times and no more than 1.1 times the root circle diameter of the male-side screw portion.

The screw shaft of the present invention may be incorporated in an electric position adjusting device for a steering wheel.

A method for manufacturing the screw shaft of the present invention includes a step of performing a rolling process on work having a large-diameter shaft portion for rolling, and a small-diameter shaft portion for rolling arranged adjacent in an axial direction to the large-diameter shaft portion for rolling, and having an outer diameter that is smaller than an outer diameter of the large-diameter shaft portion for rolling; wherein the rolling process generates walking of the work using a plurality of rolling dies in order to form a male-side screw portion over an entire length in the axial direction of an outer circumferential surface of the large-diameter shaft portion for rolling.

More specifically, in the method for manufacturing the screw shaft of the present invention, in the step of performing the rolling process on the work, a helical rolling mark is formed on an outer circumferential surface of the small-diameter shaft portion for rolling using the rolling dies, while at the same time performing the rolling process for forming the male-side screw portion on the outer circumferential surface of the large-diameter shaft portion for rolling.

Preferably, in the method for manufacturing the screw shaft of the present invention, an outer diameter of the small-diameter shaft portion for rolling is no less than 0.9 times and no more than 1.1 times a root circle diameter of the male-side screw portion to be formed on the outer circumferential surface of the large-diameter shaft portion for rolling.

In the method for manufacturing the screw shaft of the present invention, the work may have an adjacent shaft portion that is arranged adjacent to the small-diameter shaft portion for rolling on the opposite side in the axial direction to the large-diameter shaft portion for rolling, and that has an outer diameter larger than the outer diameter of the small-diameter shaft portion for rolling.

In the method for manufacturing the screw shaft of the present invention, the work may be configured such that the second small-diameter shaft portion for rolling of which has a first small-diameter shaft portion for rolling arranged on one side in the axial direction of the large-diameter shaft portion for rolling, and a second small-diameter shaft portion for rolling arranged on the other side in the axial direction of the large-diameter shaft portion for rolling. In this case, in the step of performing the rolling process on the work, using the rolling dies, while at the same time performing the rolling process for forming the male-side screw portion on the outer circumferential surface of the large-diameter shaft portion for rolling, a helical first rolling mark is formed on the outer circumferential surface of the first small-diameter shaft portion for rolling, and a helical second rolling mark is formed on the outer circumferential surface of the second small-diameter shaft portion for rolling. Preferably, both an outer diameter of the first small-diameter shaft portion and an outer diameter of the second small-diameter shaft portion are no less than 0.9 times and no more than 1.1 times the root circle diameter of the male-side screw portion.

In the method for manufacturing the screw shaft of the present invention, a screw shaft incorporated in an electric position adjusting device for a steering wheel may be applied as the screw shaft to be manufactured.

The electric position adjustment device for a steering wheel of the present invention includes an electric motor, a feed screw mechanism, and a steering component.

The feed screw mechanism includes a screw shaft having a male-side screw portion on an outer circumferential surface thereof and a nut having a female-side screw portion on an inner circumferential surface that engages with the male-side screw portion; and configured so that the screw shaft and the nut are able to move relative to each other in an axial direction based on relative rotation of the screw shaft and the nut due to a rotation force transmitted from the electric motor.

As the feed screw mechanism, it is possible to adopt either a slide screw type feed screw mechanism or a ball screw type feed screw mechanism. In the slide screw type feed screw mechanism, the male-side screw portion and the female-side screw portion directly engage or screw together. In the ball screw type feed screw mechanism, the male-side screw portion and the female-side screw portion engage with each other via a plurality of balls.

The steering component is such that in a state of being used, a steering wheel is fixed thereto, and as the screw shaft and the nut displace relative to each other in the axial direction, the steering component is able to displace in a position adjusting direction of the steering wheel.

In the electric position adjusting device for a steering wheel of the present invention, the screw shaft is configured by the screw shaft of the present invention.

In the electric position adjusting device for a steering wheel of the present invention, in a state in which the steering wheel is displaced to an end portion of a position adjustment range, a part in the axial direction of the female-side screw portion may be arranged at a position in the axial direction deviated from the male-side screw portion.

A method for manufacturing an electric adjusting device for a steering wheel of the present invention, the electric position adjusting device for a steering wheel including an electric motor, a feed screw mechanism, and a steering component; wherein the feed screw mechanism includes a screw shaft having a male-side screw portion on an outer circumferential surface thereof and a nut having a female-side screw portion on an inner circumferential surface that engages with the male-side screw portion; and configured so that the screw shaft and the nut are able to move relative to each other in an axial direction based on relative rotation of the screw shaft and the nut due to a rotation force transmitted from the electric motor; and the method includes a step of manufacturing the screw shaft by performing a rolling process on a work having: a large-diameter shaft portion for rolling; a first small-diameter shaft portion for rolling arranged on one side in the axial direction of the large-diameter shaft portion for rolling and having an outer diameter that is smaller than the outer diameter of the large-diameter shaft portion for rolling; and a second small-diameter shaft portion for rolling arranged on the other side in the axial direction of the large-diameter shaft portion for rolling and having an outer diameter that is smaller than the outer diameter of the large-diameter shaft portion for rolling; wherein the rolling process generates walking of the work using a plurality of rolling dies in order to form the male-side screw portion over an entire length in the axial direction of an outer circumferential surface of the large-diameter shaft portion for rolling.

In particular, in the method for manufacturing an electric adjusting device for a steering wheel of the present invention, in the process of manufacturing the screw shaft, the method for manufacturing a screw shaft of the present invention is adopted.

Advantageous Effects of Invention

With the present invention, an electric position adjusting device for a steering wheel is provided, the electric position adjusting device for a steering wheel including a screw shaft having good machining precision on both end portions in the axial direction of a male-side screw portion, an electric motor, and a feed screw mechanism, wherein the operating stroke of the feed screw mechanism is sufficiently maintained.

BRIEF DESCRIPTION OF THE DRAWINGS

FIG. 2A is a view similar to FIG. 1 and illustrates a state in which the steering wheel is located at the rear end portion of the front-rear position adjustment range, and FIG. 2B is a view similar to FIG. 1 and illustrates a state in which the steering wheel is located at the front end portion of the front-rear position adjustment range.

DESCRIPTION OF EMBODIMENTS

Example

An example of an embodiment of the present invention will be described with reference to FIGS. 1 to 9.
(Electric Position Adjusting Device for Steering Wheel and Screw Shaft)

Figure 1:
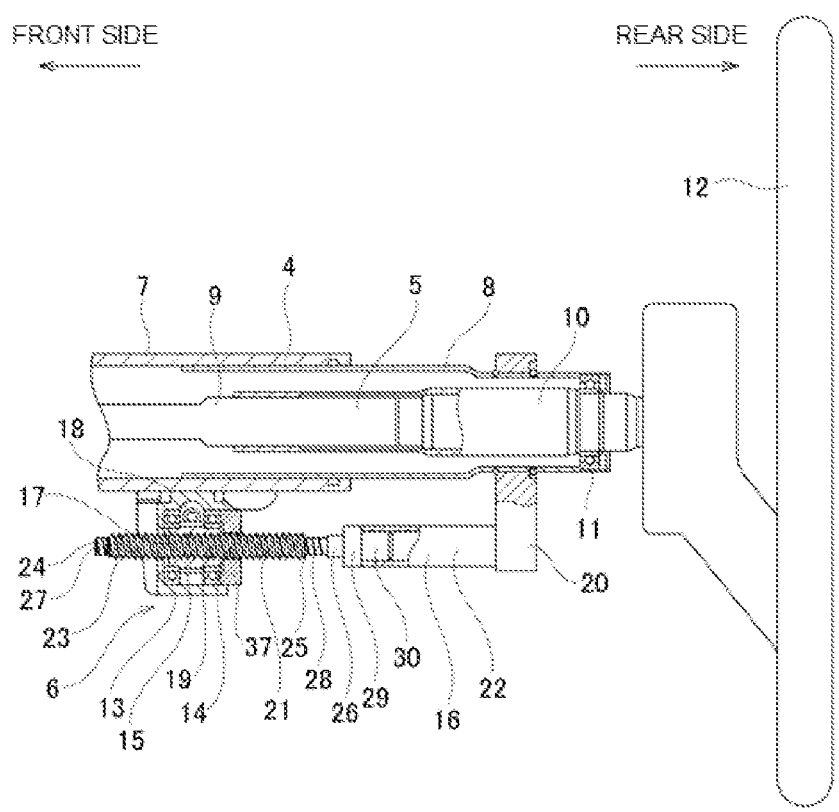
FIG. 1 is a partial cross-sectional view illustrating an electric position adjusting device for a steering wheel according to an example of an embodiment of the present invention.
Figure 3:
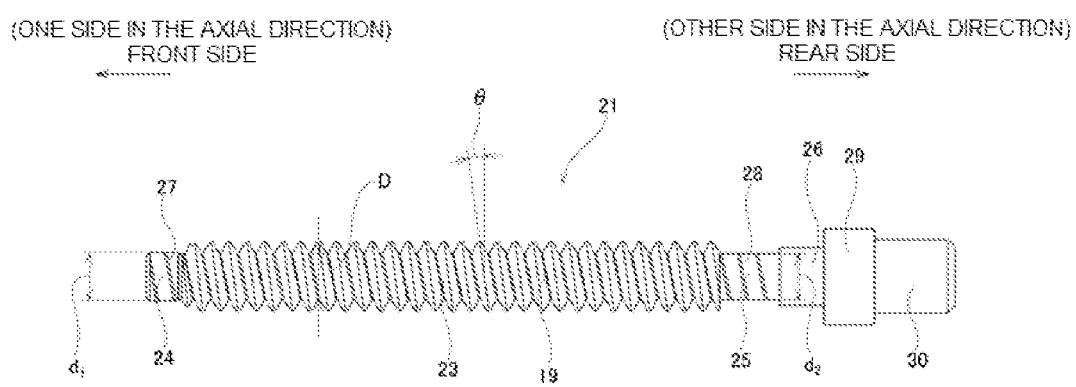
FIG. 3 is a side view of a screw shaft according to an example of an embodiment of the present invention.

FIG. 1 and FIG. 2 illustrate an electric position adjusting device for a steering wheel that uses the screw shaft 21 (FIG. 3) of this example. Note that in regard to the electric position adjusting device for a steering wheel, the front-rear direction means the front-rear direction of the vehicle in which the device is assembled, where the front side is the left side in FIGS. 1 to 3, and the rear side is the left side in FIGS. 1 to 3. Moreover, the electric position adjusting device for a steering wheel of this example enables the front-rear position adjustment of the steering wheel 12 by using an electric motor (not illustrated) as a drive source. FIG. 1 illustrates a state in which the steering wheel 12 is located in an intermediate portion of the front-rear position adjustment range; FIG. 2A illustrates a state in which the steering wheel 12 is located at the rear end portion of the front-rear position adjustment range; and FIG. 2B illustrates a state in which the steering wheel 12 is located at the front end portion of the front-rear position adjustment range.

The electric position adjusting device for a steering wheel of the present invention may be configured by a steering column 4, a steering shaft 5, and an electric actuator 6. The electric position adjusting device for a steering wheel of the present invention includes at least an electric motor (not illustrated) and a feed screw mechanism 14 constituting the electric actuator 6, and an outer tube 10 constituting a steering shaft 5 and corresponding to a steering component.

The steering column 4 includes a front-side outer column 7 and a rear-side inner column 8 that are combined with each other in a telescopic shape. The outer column 7 is prevented from being displaced in the axial direction with respect to the vehicle body. The front side portion of the inner column 8 is slidably inserted into the inner diameter side of the rear side portion of the outer column 7.

The steering shaft 5 includes an inner shaft 9 on the front side and an outer tube 10 on the rear side. The inner shaft 9 and the outer tube 10 are combined by spline engagement or the like so as to be able to transmit torque and so as to be able to be expanded or contracted. The inner shaft 9 is rotatably supported on the inner diameter side of the outer column 7 via a bearing (not illustrated). The outer tube 10 is rotatably supported on the inner diameter side of the inner column 8 via a bearing 11. With this kind of a configuration, the steering shaft 5 is rotatably supported on the inner diameter side of the steering column 4. Together with this, the inner column 8 and the outer tube 10 may be relatively displaced in the axial direction with respect to the outer column 7 and the inner shaft 9. The steering wheel 12 is supported by and fixed to the rear-side end portion of the outer tube 10 that is a steering component.

The electric actuator 6 includes a housing 13, a feed screw mechanism 14, and an electric motor (not illustrated). The housing 13 is supported by and fixed to the lower surface of the outer column 7.

The feed screw mechanism 14 includes a nut 15 and a rod 16. The central axis of the feed screw mechanism 14 is arranged parallel to the central axes of the steering shaft 5 and the steering column 4.

The nut 15 has a female-side screw portion 17 on the inner circumferential surface. The nut 15 is rotatably supported in the housing 13 so as not to be able to displace in the axial direction, and may be rotationally driven by an electric motor via a worm reducer 18.

The rod 16 is configured by combining a screw shaft 21 arranged on the front side and an extension shaft 22 arranged on the rear side. The rear-side end portion of the extension shaft 22 of the rod 16 is connected to the rear-side portion of the inner column 8 via an arm portion 20. The screw shaft 21 includes a large-diameter shaft portion 23, a first small-diameter shaft portion 24 and a second small-diameter shaft portion 25 corresponding to a small-diameter shaft portion, and a base-end-side shaft portion 26 corresponding to an adjacent shaft portion.

The large-diameter shaft portion 23 has a male-side screw portion 19 along the entire length in the axial direction on the outer circumferential surface that engages with the female-side screw portion 17. The male-side screw portion 19 is formed by a rolling process. The intermediate portion in the axial direction of the male-side screw portion 19 except for the edge portions on both ends in the axial direction is configured by a completely threaded portion having a specified thread height. Each of the edge portions on both ends in the axial direction of the male-side screw portion 19 is configured by an incompletely threaded portion not reaching a specified thread height. In this example, the entire male-side screw portion 19, including not only the completely threaded portion but also the incompletely threaded portion, is precisely finished so as to function as a normal threaded portion. In other words, the flank surface of the male-side screw portion 19 is precisely finished not only in the intermediate portion in the axial direction which is a completely threaded portion but also on the edge portions on both ends in the axial direction which are incompletely threaded portions. Therefore, in this example, the length in the axial direction of the entire male-side screw portion 19 corresponds to the effective screw length. Note that the flank surface is the side surface of the thread, or in other words, the tooth surface. In this example, the lead angle (advance angle) $\theta$ of the male-side screw portion 19 is less than 4°. However, in a case of implementing the present invention, the lead angle $\theta$ of the male-side screw portion 19 can be set to 4° or more.

The first small-diameter shaft portion 24 is arranged adjacent to one side in the axial direction, which is the front side of the large-diameter shaft portion 23. The first small-diameter shaft portion 24 is a column-shaped portion having an outer diameter smaller than the outer diameter of the large-diameter shaft portion 23, and has a helical first rolling mark 27 on the outer circumferential surface. The first rolling mark 27 is formed by rolling dies 35 for forming the male-side screw portion 19 in the rolling process. The first rolling mark 27 is in phase with the extension line of the spiral curve that is the root circle line of the male-side screw portion 19.

The second small-diameter shaft portion 25 is arranged adjacent to the other side in the axial direction, which is the rear side of the large-diameter shaft portion 23. The second small-diameter shaft portion 25 is a column-shaped portion having an outer diameter smaller than the outer diameter of the large-diameter shaft portion 23, and has a helical second rolling mark 28 on the outer circumferential surface. The second rolling mark 28 is formed by rolling dies 35 for forming the male-side screw portion 19 in the rolling process. The second rolling mark 28 is in phase with the extension line of the spiral curve that is the root circle line of the male-side screw portion 19.

In this example, the outer diameter $d_1$ of the first small-diameter shaft portion 24 and the outer diameter $d_2$ of the second small-diameter shaft portion 25 are equal to each other ($d_1=d_2$). However, in a case of implementing the present invention, the outer diameter $d_1$ of the first small-diameter shaft portion 24 and the outer diameter $d_2$ of the second small-diameter shaft portion 25 may be made different from each other.

In this example, the outer diameter $d_1$ of the first small-diameter shaft portion 24 and the outer diameter $d_2$ of the second small-diameter shaft portion 25 are both set to be no less than 0.9 times and no more than 1.1 times the root circle diameter D of the male-side screw portion 19 (range of ±10% the root circle diameter) ($1.1D \geq d_1 \geq 0.9D$, $1.1D \geq d_2 \geq 0.9D$). However, in a case of implementing present invention, the range of the outer diameters $d_1$ and $d_2$ may be set to a range different from the range of this example.

In this example, the outer diameter $d_1$ of the first small-diameter shaft portion 24 and the outer diameter $d_2$ of the second small-diameter shaft portion 25 are each smaller than the inner diameter of the female-side screw portion 17 of the nut 15 (the inscribed circle diameter of the thread). Therefore, each of the first rolling mark 27 and the second rolling mark 28 does not engage with the female-side screw portion 17 of the nut 15. In other words, each of the first rolling mark 27 and the second rolling mark 28 corresponds to a non-threaded portion that does not function as a male screw portion that engages with the female-side screw portion 17 of the nut 15.

The base-end-side shaft portion 26 is on the side opposite to the large-diameter shaft portion 23 in the axial direction with respect to the second small-diameter shaft portion 25, or in other words, is arranged adjacent to the other side in the axial direction, which is the rear side of the second small-diameter shaft portion 25. The base-end-side shaft portion 26 is a stepped column-shaped portion having an outer diameter that is larger than the outer diameter of the second small-diameter shaft portion 25 as a whole. The base-end-side shaft portion 26 has a flange portion 29 projecting outward in the radial direction at an intermediate portion in the axial direction. Moreover, the portion of the base-end-side shaft portion 26 located further on the rear side than the flange portion 29 is configured by a column-shaped insertion portion 30.

The extension shaft 22 is a hollow shaft having a circular tube shape. The insertion portion 30 of the screw shaft 21 is internally fitted and fixed to the front-side end portion of the extension shaft 22. The rear-side end surface of the flange portion 29 of the screw shaft 21 comes in contact with the front-side end surface of the extension shaft 22, whereby that the screw shaft 21 is positioned in the axial direction with respect to the extension shaft 22.

When adjusting the front-rear position of the steering wheel 12, the rod 16 is displaced in the axial direction with respect to the nut 15 by rotationally driving the nut 15 by an electric motor via the worm reducer 18. As the rod 16 displaces in the axial direction, the inner column 8 connected to the rod 16 via the arm portion 20 and the outer tube 10 supported on the inner diameter side of the inner column 8 displace in the same direction as the rod 16 (position adjustment direction of the steering wheel 12), and the front-rear position of the steering wheel 12 is adjusted. In this example, the lead angle θ of the male-side screw portion 19 is less than 4°, so it is difficult for the nut 15 to rotate even in a case where an axial force acts as reverse input from the rod 16 to the nut 15.

In this example, the entire male-side screw portion 19 of the screw shaft 21 of the feed screw mechanism 14 is finished with good precision so as to function as a normal screw portion. Therefore, when adjusting the front-rear position of the steering wheel 12, the rod 16 may be displaced in the axial direction with respect to the nut 15 until the position where the edge portion of the end in the axial direction of the male-side screw portion 19 engages with the female-side screw portion 17. Furthermore, the rod 16 may be displaced in the axial direction with respect to the nut 15 until a part in the axial direction of the female-side screw portion 17 reaches a position in the axial direction separated from the male-side screw portion 19.

In this example, as illustrated in FIG. 2A, the steering wheel 12 may be moved toward the rear side until the front-side portion in the axial direction of the female-side screw portion 17 reaches the periphery of the first small-diameter shaft portion 24 (a position that covers at least the entire first rolling mark 27). In this example, as illustrated in FIG. 2B, the steering wheel 12 may be moved toward the front side until the rear-side portion in the axial direction of the female-side screw portion 17 reaches the periphery of the second small-diameter shaft portion 25 (a position that covers at least the entire second rolling mark 28).

In this example, in a case where the male-side screw portion 19 is set to a specified length, the operating stroke of the feed screw mechanism 14 may be lengthened, or in other words, the adjustment range of the front-rear position of the steering wheel 12 may be increased when compared to conventional products in which both end portions in the axial direction of the male-side screw portion cannot function as normal screw portion. On the other hand, in a case where the operating stroke of the feed screw mechanism 14 is determined to be a specified length, the dimension in the axial direction of the feed screw mechanism 14 may be made smaller as compared with the conventional product in which both end portions in the axial direction of the male-side screw portion may not function as normal screw portions. In particular, in this example, the rod 16 may be displaced in the axial direction with respect to the nut 15 until a part in the axial direction of the female-side screw portion 17 reaches a position in the axial direction that is separated from the male-side screw portion 19. By that amount, the effect of being able to enlarge the adjustment range of the front-rear position of the steering wheel 12 and the effect of being able to reduce the dimension in the axial direction of the feed screw mechanism 14 may be further improved by that amount.

In a case of implementing the present invention, in a state of adopting a configuration in which a part of the female-side screw portion in the axial direction is arranged at a position in the axial direction that is separated from the male-side screw portion in a state in which steering wheel is displaced to the end portion of the position adjustment range, the length La in the axial direction of the part in the axial direction of the female-side screw portion may be set to be at most about 70% of the length Lb in the axial direction of the engaging section between the female-side screw portion and the male-side screw portion in this state (La≈0.7Lb).

In this example, it is possible to move a part in the axial direction of the female-side screw portion 17 of the nut 15 to the periphery of the first rolling mark 27 and the second rolling mark 28, so the first rolling mark 27 and the second rolling mark 28 are able to function as a grease reservoir for lubrication of the feed screw mechanism 14.

In this example, as illustrated in FIG. 2B, it is configured such that in a case where the steering wheel 12 is moved to the front end portion of the position adjustment range, the rear-side surface of an annular contact member 37 that is fixed to the rear end portion of the housing 13 and arranged around the screw shaft 21 comes in contact with the front-side surface of the flange portion 29 of the base-end-side shaft portion 26. Therefore, the steering wheel 12 is prevented from moving further toward the front side. In other words, the flange portion 29 functions as a stopper that specifies the front end portion of the position adjustment range of the steering wheel 12.

(Manufacturing Method of Electric Position Adjusting Device for Steering Wheel and Manufacturing Method of Screw Shaft)

The manufacturing method of an electric position adjusting device for a steering wheel of the present invention relates to a method of manufacturing an electric position adjusting device for a steering wheel that includes an electric motor (not illustrated), a feed screw mechanism 14, and an outer tube 10 that is a steering component; where the feed screw mechanism 14 includes a screw shaft 21 having a male-side screw portion 19 on the outer circumferential surface and a nut 15 having a female-side screw portion 17 on the inner circumferential surface that engages with the male-side screw portion 19; and based on the relative rotation of the screw shaft 21 and the nut 15 by the rotational force transmitted from the electric motor, the screw shaft 21 and the nut 15 are configured to be able to displace relative to each other in the axial direction; and as a result, the outer tube 10 is able to displace in the position adjusting direction of the steering wheel 12.

The method for manufacturing the electric position adjusting device for a steering wheel of the present invention includes a step for manufacturing a screw shaft 21 by performing a rolling process on a work 31 that includes a large-diameter shaft portion for rolling 32, and a first small-diameter shaft portion for rolling 33 and a second small-diameter shaft portion for rolling 34 that are arranged adjacent in the axial direction of the large-diameter shaft portion for rolling 32 and having an outer diameter that is smaller than the outer diameter of the large-diameter shaft portion for rolling 32, to form a male-side screw portion 19 over the entire length of the outer circumferential surface of the large-diameter shaft portion for rolling 32, where a plurality of rolling dies 35 are used and walking occurs on the work 31.

The method for manufacturing the screw shaft 21 of the present invention will be described with reference to FIGS. 4 to 9. In the following description, unless otherwise specified, the axial direction means the axial direction of the work 31 which is an intermediate blank of the screw shaft 21, one side in the axial direction is the left side in FIGS. 4 to 9, and the other side in the axial direction is the right side in FIGS. 4 to 9.

Figure 4:
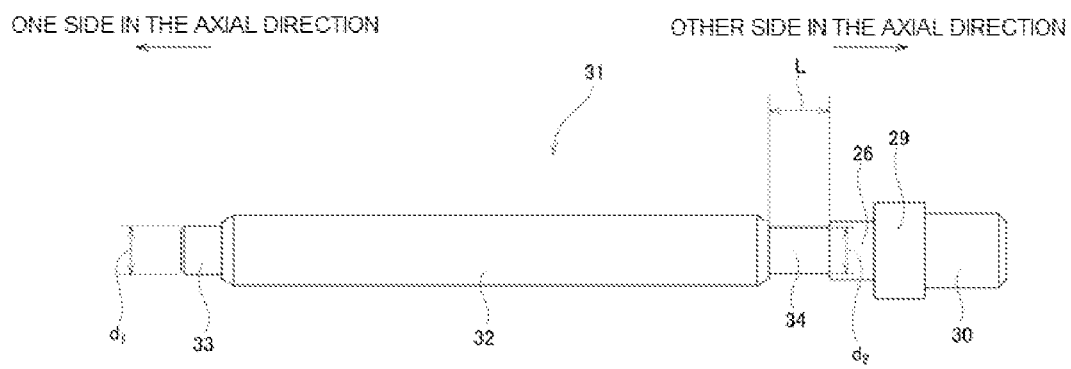
FIG. 4 is a side view of a work that is an intermediate blank of a screw shaft according to an example of an embodiment of the present invention.

FIG. 4 illustrates the work 31. The work 31 has a shape other than the male-side screw portion 19, the first rolling mark 27, and the second rolling mark 28 of the screw shaft 21 (see FIG. 3). In other words, the work 31 has a large-diameter shaft portion for rolling 32 in which a male-side screw portion 19 is formed on the outer circumferential surface, a first small-diameter shaft portion for rolling 33 in which a first rolling mark 27 is formed on the outer circumferential surface, a second small-diameter shaft portion for rolling 34 in which a second rolling mark 28 is formed on the outer circumferential surface, and a base-end-side shaft portion 26.

The outer circumferential surface of the large-diameter shaft portion for rolling 32 is a cylindrical surface, the outer diameter of which does not change with respect to the axial direction, except for chamfered portions formed at the edge portions on both ends in the axial direction. The first small-diameter shaft portion for rolling 33 is arranged adjacent to the one side in the axial direction of the large-diameter shaft portion for rolling 32, and has an outer diameter smaller than the outer diameter of the large-diameter shaft portion for rolling 32. The second small-diameter shaft portion for rolling 34 is arranged adjacent to the other side in the axial direction of the large-diameter shaft portion for rolling 32, and has an outer diameter smaller than the outer diameter of the large-diameter shaft portion for rolling 32. Moreover, the outer diameter of the first small-diameter shaft portion for rolling 33 is $d_1$, which is the same as the outer diameter of the first small-diameter shaft portion 24 (see FIG. 3), and the outer diameter of the second small-diameter shaft portion for rolling 34 is $d_2$, which is the same as the outer diameter of the second small diameter shaft portion 25 (see FIG. 3).

Figure 5:
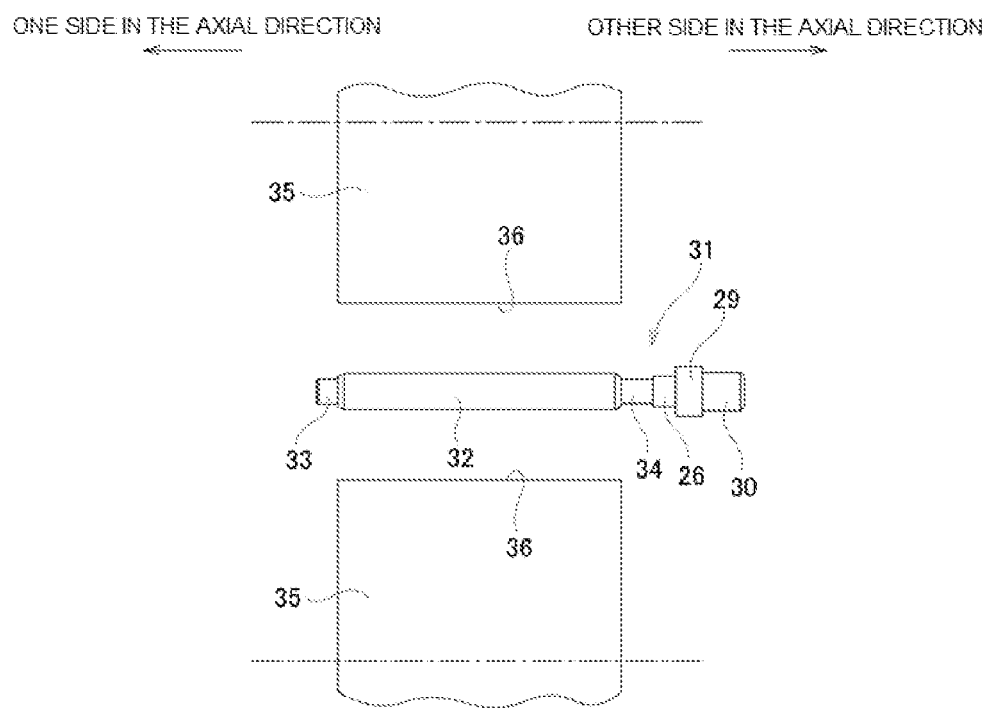
FIG. 5 is a diagram of an example of an embodiment of the present invention, and illustrates a state in which a work is set in a rolling machine.

In a case where a rolling process is performed on the work 31 in order to obtain the screw shaft 21, the work 31 is first set on the rolling machine as illustrated in FIG. 5. The rolling machine includes a pair of rolling dies 35. Each of the rolling dies 35 is a round die having a short cylindrical shape, and is arranged in parallel with each other with the outer circumferential surfaces facing each other. Each of the rolling dies 35 has helical rolling teeth 36 on the outer circumferential surface for rolling the male-side screw portion 19 (see FIG. 9, the shape is not illustrated in FIGS. 5 to 8). Further, in this example, the dimension in the axial direction of the rolling dies 35 is substantially equal to the dimension in the axial direction of the large-diameter shaft portion for rolling 32 of the work 31. However, in a case of implementing the present invention, the dimension in the axial direction of the rolling dies 35 may be made larger or smaller than the dimension in the axial direction of the large-diameter shaft portion for rolling 32.

As illustrated in FIG. 5, in the stage in which the work 31 is set on the rolling machine, the distance between the outer circumferential surfaces of the pair of rolling dies 35 is sufficiently larger than the outer diameter of the large-diameter shaft portion for rolling 32 of the work 31. In a state in which the work 31 is set on the rolling machine, the work 31 is arranged parallel to the pair of rolling dies 35 at a center position between the outer circumferential surfaces of the pair of rolling dies 35. Each of the outer circumferential surfaces of the rolling dies 35 faces the outer circumferential surface of the large-diameter shaft portion for rolling 32 of the work 31. Furthermore, the work 31 is held on both sides in the axial direction by a pair of centers provided in a work support device (not illustrated) of the rolling machine. In this state, the work 31 is rotatably supported by the work support device and moved in the axial direction with respect to the pair of rolling dies 35. Even in a case where the work 31 is stretched due to the rolling process of the work 31, the work support device allows the stretching by increasing the distance between the pair of centers.

In a state in which the work 31 set on the rolling machine, a holding force in the axial direction is applied to the work 31 from the pair of centers. In the case of this example, the portion of the work 31 located further on the other side in the axial direction than the large-diameter shaft portion for rolling 32 is configured by the second small-diameter shaft portion for rolling 34 and the base-end-side shaft portion 26. The outer diameter of the base-end-side shaft portion 26 is larger than the outer diameter of the second small-diameter shaft portion for rolling 34. Therefore, in the case of the work 31 of this example, the rigidity of the portion that is located further on the other side in the axial direction than the large-diameter shaft portion for rolling 32 becomes higher compared with a case where the outer diameter of the portion corresponding to the base-end-side shaft portion 26 is equal to the outer diameter of the second small-diameter shaft portion for rolling 34. Therefore, when a holding force in the axial direction is applied from the pair of centers, it is possible to effectively prevent the portion located further on the other side in the axial direction than the large-diameter shaft portion for rolling 32 from buckling.

Figure 6:
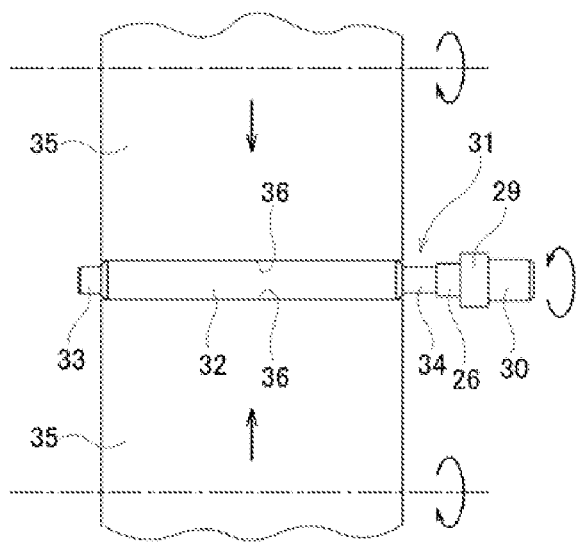
FIG. 6 is a diagram of an example of an embodiment of the present invention, and illustrates a state in which the distance between the pair of rolling dies rotating in the forward rotation direction is narrowed, and the rolling dies are pressed against the large-diameter shaft portion of the work to be rolled in order to start the rolling process.

Next, while rotating the pair of rolling dies 35 in the same direction, the distance between the pair of rolling dies 35 is narrowed. As illustrated in FIG. 6, cutting, which is a step in which the outer circumferential surface (rolling teeth 36) of a pair of rolling dies 35 is made to bite into the outer circumferential surface of the large-diameter shaft portion for rolling 32 for rolling of the work 31, is started. When the cutting is started, a rotational force is applied to the work 31 from the pair of rolling dies 35, and the work 31 rotates in the opposite direction to the pair of rolling dies 35. As a result, the entire circumference of the outer circumferential surface of the large-diameter shaft portion for rolling 32 of the work 31 is rolled, and the male-side screw portion 19 is gradually formed.

In the rolling process of this example, based on the lead angle error that occurs between the rolling teeth 36 of the pair of rolling dies 35 and the large-diameter shaft portion for rolling 32 of the work 31 as the cutting progresses, walking, which is a phenomenon in which the work 31 moves in the axial direction with respect to the pair of rolling dies 35, occurs.

Figures 7A, 7B:
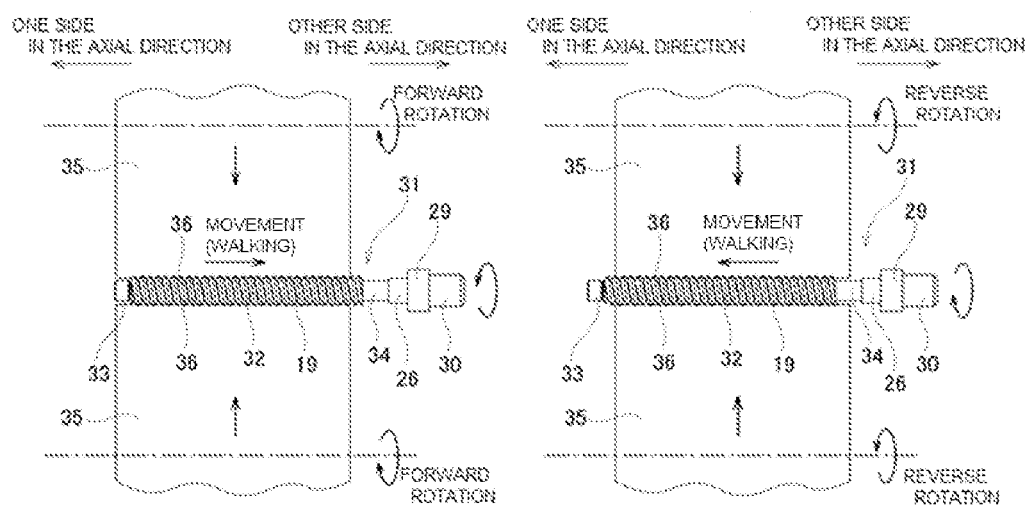
FIG. 7A is a diagram of an example of an embodiment of the present invention, and illustrates a state during an intermediate stage in the rolling process in which the work has walked to the end on one side in the axial direction as the pair of rolling dies rotate in the forward rotation direction.
FIG. 7B is a diagram illustrating a state in which the work has walked to the end on the other side in the axial direction as the pair of rolling dies rotate in the reverse rotation direction.

In this example, the pair of rolling dies 35 is alternately rotated by NC control in a forward rotation direction, which is the rotation direction at the start of cutting, and in a reverse rotation direction, which is the opposite direction. Therefore, the work 31 undergoes a rolling process while moving back-and-forth in the axial direction between the outer circumferential surfaces of the pair of rolling dies 35. More specifically, in a case where the pair of rolling dies 35 rotate in the forward rotation direction, the work 31 moves to the other side in the axial direction as illustrated in FIG. 7A, and in a case where the pair of rolling dies 35 rotate in the reverse direction, the work 31 moves to the one side in the axial direction as illustrated in FIG. 7B. Rolling of the work 31 is performed while the work 31 repeatedly and alternately moves to the one side in the axial direction and to the other side in the axial direction.

In this example, configuration is such that due to the NC control, the movement of the work 31 to the other side in the axial direction stops at a position in the axial direction illustrated in FIG. 7A. The position in the axial direction illustrated in FIG. 7A is a position in the axial direction where the entire first small-diameter shaft portion for rolling 33 of the work 31 has finished entering between the outer circumferential surfaces of the pair of rolling dies 35. Similarly, the movement of the work 31 to the one side in the axial direction stops at the position in the axial direction illustrated in FIG. 7B. The position in the axial direction illustrated in FIG. 7B is a position in the axial direction where a portion of the second small-diameter shaft portion for rolling 34 of the work 31 except the end portion on the other side in the axial direction has finished entering between the outer circumferential surfaces of the pair of rolling dies 35. Therefore, in this example, the rolling process is performed without each of the pair of rolling dies 35 colliding with the base-end-side shaft portion 26 of the work 31.

Figures 8A, 8B:
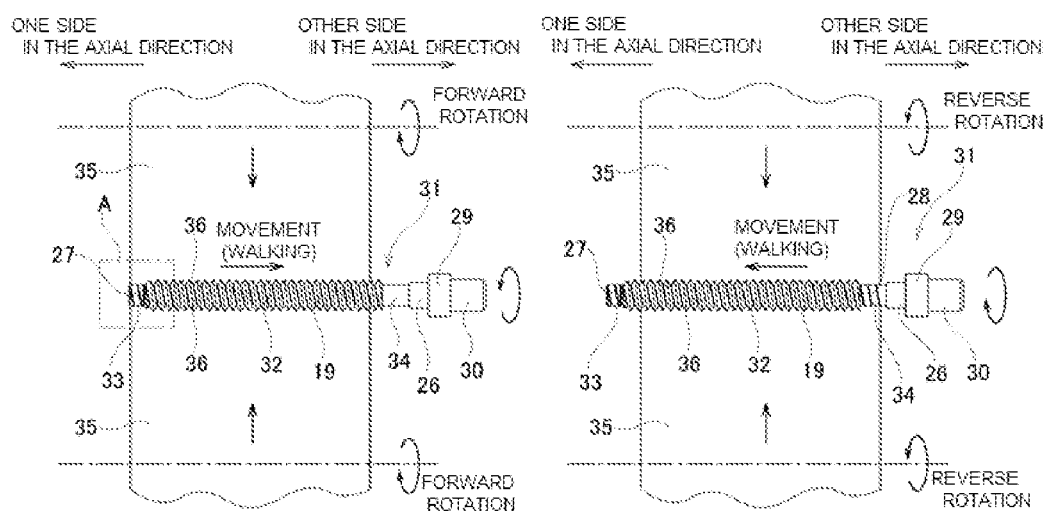
FIG. 8A is a diagram of an example of an embodiment of the present invention, and illustrates a state during the final stage of the rolling process in which, as the pair of rolling dies rotate in the forward rotation direction, the work walks to the end on one side in the axial direction, and the rolling marks are formed on the outer circumferential surface of the small diameter shaft portion to be rolled on the other side in the axial direction of the work.
FIG. 8B is a diagram illustrating a state during the final stage of the rolling process in which as the pair of rolling dies rotate in the reverse rotation direction, the work walks to the end on the other side in the axial direction, and the rolling marks are formed on the outer circumferential surface of the small-diameter shaft portion to be rolled on the one side in the axial direction of the work.
Figure 9:
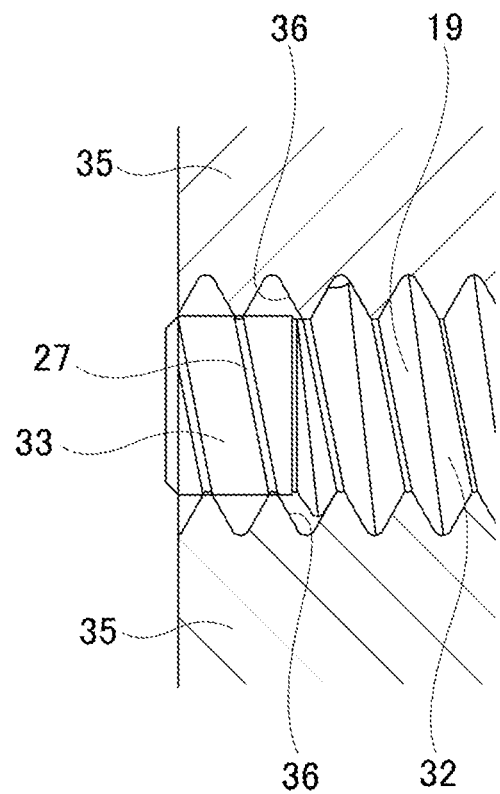
FIG. 9 is an enlarged view of part A of FIG. 8A.
Figure 10A:
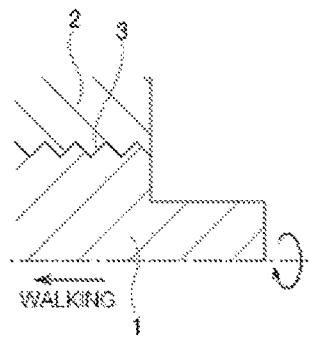
FIGS. 10A to 10C are diagrams for describing problems that occur in a conventional screw rolling process.
Figure 10B:
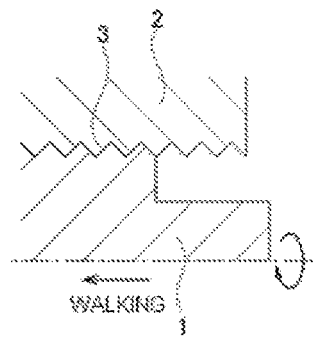
Figure 10C:
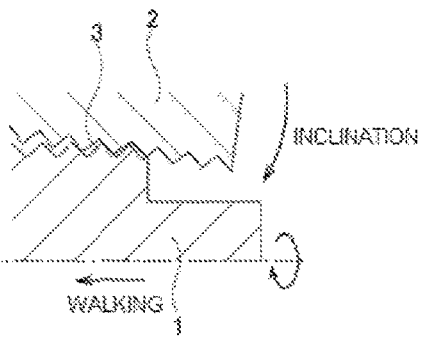

In this example, in the cutting process, as illustrated in FIGS. 8A and 9, a rolling process is performed for forming the male-side screw portion 19 on the outer circumference of the large-diameter shaft portion for rolling 32 by a pair of rolling dies 35, while at the same time forming a helical first rolling mark 27 on the outer circumferential surface of the first small-diameter shaft portion for rolling 33, and as illustrated in FIG. 8B, a rolling process is performed for forming the male-side screw portion 19 on the outer circumferential surface of the large-diameter shaft portion for rolling 32 by a pair of rolling dies 35, while at the same time forming a helical second rolling mark 28 on the outer circumferential surface of the second small-diameter shaft portion for rolling 34. In this example, the first rolling mark 27 and the second rolling mark 28 are formed in this way, so each of the first rolling mark 27 and the second rolling mark 28 is a helical mark having the same phase as the extension line of the spiral curve which is the root circle line of the male-side screw portion 19.

When the outer diameter $d_1$ of the first small-diameter shaft portion for rolling 33 and the outer diameter $d_2$ of the second small-diameter shaft portion for rolling 34 are equal to or greater than the root circle diameter D of the male-side screw portion 19, each of the first rolling mark 27 and the second rolling mark 28 is a helical mark formed in connection with the male-side screw portion 19. On the other hand, when the outer diameter $d_1$ of the first small-diameter shaft portion for rolling 33 and the outer diameter $d_2$ of the second small-diameter shaft portion for rolling 34 are to some extent smaller than the root circle diameter D of the male-side screw portion 19, each of the first rolling mark 27 and the second rolling mark 28 and the male-side screw portion 19 may be discontinuous.

After completing the cutting process, the distance between the pair of rolling dies 35 is widened, and the completed screw shaft 21 is taken out from the rolling machine.

With the manufacturing method of the screw shaft 21 of this example, the flank surface of the male-side screw portion 19 may be precisely finished not only in the intermediate portion in the axial direction which is a completely threaded portion, but also on the edge portions on both ends in the axial direction which are incompletely threaded portions.

In this example, after the cutting process is started, first, as illustrated in FIGS. 7A and 7B, a rolling process is performed for forming the male-side screw portion 19 in a state where the outer circumferential surfaces of the pair of rolling dies 35 are in contact with only the outer circumferential surface of the large-diameter shaft portion for rolling 32 of the work 31. At this time, as illustrated in FIG. 7A, in a case where the end portion of the one side in the axial direction of the outer circumferential surface of the pair of rolling dies 35 deviates in the axial direction from the outer circumferential surface of the large-diameter shaft portion for rolling 32 due to walking generated in the work 31; or as illustrated in FIG. 7B, in a case where the end portion on the other side in the axial direction of the outer circumferential surface of the pair of rolling dies 35 deviates in the axial direction from the outer circumferential surface of the large-diameter shaft portion for rolling 32 due to walking generated in the work 31, a large change occurs in the distribution of the rolling load acting between the pair of rolling dies 35 and the work 31. By the amount corresponding to this change, the elastic deformation amount of the rolling machine supporting the pair of rolling dies 35 and the work 31 changes, so relative displacement such as inclination or the like tends to occur between the pair of rolled dies 35 and the work 31. As a result, the machining precision of both end portions in the axial direction of the male-side screw portion 19 during machining becomes low.

However, in the final stage of the cutting process, as illustrated in FIGS. 8A and 8B, the outer circumferential surfaces of the pair of rolling dies 35 not only come in contact with the outer circumferential surface of the large-diameter shaft portion for rolling 32, but also come in contact with the outer circumferential surface of the first small-diameter shaft portion for rolling 33 and the second small-diameter shaft portion for rolling 34. At this time, as illustrated in FIG. 8A, in a case where the end portion on the one side in the axial direction of the outer circumferential surface of the pair of rolling dies 35 deviates in the axial direction from the outer circumferential surface of the large-diameter shaft portion for rolling 32 due to walking that occurs in the work 31, the end portion on the one side in the axial direction of the outer circumferential surface of the pair of rolling dies 35 comes in contact with and is supported by the first small-diameter shaft portion for rolling 33, so it is possible to prevent a large change in the distribution of the rolling load acting between the pair of rolling dies 35 and the work 31. At this time, as illustrated in FIG. 8B, in a case where the end portion on the other side in the axial direction of the outer circumferential surface of the pair of rolling dies 35 deviates in the axial direction from the outer circumferential surface of the large-diameter shaft portion for rolling 32 due to walking that occurs in the work 31, the end portion on the other side in the axial direction of the outer circumferential surface of the pair of rolling dies 35 comes in contact with and is supported by the second small-diameter shaft portion for rolling 34, so it is possible to prevent a large change in the distribution of the rolling load acting between the pair of rolling dies 35 and the work 31. Therefore, in the final stage of the cutting process, it is possible to keep the change in the amount of elastic deformation of the rolling machine supporting the pair of rolling dies 35 and the work 31 small. Therefore, it is possible to make it difficult for displacement such as inclination or the like to occur between the pair of rolling dies 35 and the work 31.

In this example, the male-side screw portion 19 is a so-called triangular thread of a metric coarse screw, and as illustrated in FIGS. 8 and 9, in the final stage of the cutting process, by increasing the cutting amount to the extent that the material of the work 31 (the top of the male-side screw portion 19) comes into contact with the root portion of the rolling teeth 36 of the pair of rolling dies 35, the contact area between the pair of rolling dies 35 and the work 31 increases. Therefore, this also makes it possible to make it difficult for relative displacement such as inclination or the like to occur in the final stage of the cutting process. As a result, in the final stage of the cutting process, the machining precision of both end portions in the axial direction of the male-side screw portion 19 may be improved. In other words, the flank surface of the male-side screw portion 19 is precisely finished not only in the intermediate portion in the axial direction, which is a completely threaded portion, but also in the edge portions on both ends in the axial direction, which are incompletely threaded portions.

In a case of implementing the present invention, it is also possible to adopt a method of double rolling (double rotation rolling), which is a method of performing rolling on the work 31 in two steps. In this case, by making the thread of the male-side screw portion 19 higher in the second rolling process, it is possible to make it more difficult for relative displacement such as inclination or the like to occur in the final stage of the cutting process.

In a case of implementing the present invention, when the outer diameter $d_1$ of the first small-diameter shaft portion for rolling 33 and the outer diameter $d_2$ of the second small-diameter shaft portion for rolling 34 are made larger than the root circle diameter D of the male-side screw portion 19, as these outer diameters $d_1$ and $d_2$ become larger in the final stage of the cutting process, the resistance force becomes larger when the end portions in the axial direction of the rolling teeth 36 of the rolling dies 35 ride up on the first small-diameter shaft portion for rolling 33 or second small-diameter shaft portion for rolling 34 from the large-diameter shaft portion for rolling 32.

In other words, a chamfered portion (not illustrated) such as a C chamfered portion, an R chamfered portion or the like exists on the edge portion of the end in the axial direction of the rolling teeth 36. When the end portion in the axial direction of the rolling teeth 36 rides up on the first small-diameter shaft portion for rolling 33 or the second small-diameter shaft portion for rolling 34 from the large-diameter shaft portion for rolling 32, the chamfered portion pushes the material of the first small-diameter shaft portion for rolling 33 or the second small-diameter shaft portion for rolling 34 in the axial direction. However, the chamfered portion does not have teeth (blades), so the resistance force against the pushing of the material in the axial direction is large. Moreover, the amount that the chamfered portion pushes the material in the axial direction increases as the outer diameters $d_1$ and $d_2$ increase. Therefore, the resistance force becomes larger as the outer diameters $d_1$ and $d_2$ become larger. When the resistance force becomes excessive, excessive elongation or twisting occurs in the work 31, which adversely affects the machining precision of the male-side screw portion 19.

In this example, in order that such a problem does not occur, in a case where the outer diameter $d_1$ of the first small-diameter shaft portion for rolling 33 and the outer diameter $d_2$ of the second small-diameter shaft portion for rolling 34 are made larger than the root circle diameter D of the male-side screw portion 19, these outer diameters $d_1$ and $d_2$ are set to be 1.1 times or less of the root circle diameter D (+10% or less based on the root circle diameter D) of the male-side screw portion 19 ($1.1D \geq d_1 > D$, $1.1D \geq d_2 > D$).

On the other hand, in a case where the outer diameter $d_1$ of the first small-diameter shaft portion for rolling 33 and the outer diameter $d_2$ of the second small-diameter shaft portion for rolling 34 are made smaller than the root circle diameter D of the male-side screw portion 19, when these diameters $d_1$, $d_2$ are too small, relative displacement such as an inclination or the like generated between the pair of rolling dies 35 and the work 31 may not be sufficiently suppressed in the states illustrated in FIGS. 8A and 8B.

In this example, in order that such a problem does not occur, in a case where the outer diameter $d_1$ of the first small-diameter shaft portion for rolling 33 and the outer diameter $d_2$ of the second small-diameter shaft portion for rolling 34 are made smaller than the root circle diameter D of the male-side screw portion 19, these outer diameters $d_1$ and $d_2$ are set to be 0.9 times or more of the root circle diameter D (−10% or more based on the root circle diameter D) of the male-side screw portion 19 ($D > d_1 \geq 0.9D$, $D > d_2 \geq 0.9D$).

In a case of implementing the present invention, the number of threads of the male-side screw portion 19 of the screw shaft 21 to be manufactured is not particularly limited. For example, besides a single thread as illustrated in the figures, the male-side screw portion 19 may be a double thread. When the male-side screw portion 19 is configured by a double thread, the load balance when performing rolling is improved as compared with a case where the male-side screw portion 19 is a single thread.

In a case of implementing the present invention, the range in the axial direction for forming the first rolling mark 27 and the second rolling mark 28, the lengths in the circumferential direction of the first rolling marks 27 and the second rolling marks 28, and the like may be set to arbitrary values. For example, the length in the axial direction of the range in the axial direction for forming the first rolling mark 27 and the second rolling mark 28 may be about 0.02 to 2.5 times (for example, about 1.0 to 1.5 times) the lead of the male-side screw portion 19.

In this example, in order to avoid interference between the rolling dies 35 and the base-end-side shaft portion 26 during the rolling process, there is a portion of the second small-diameter shaft portion 25 where the second rolling mark 28 is not formed at the end portion on the other side in the axial direction. However, in a case of implementing the present invention, the entire portion located on the other side in the axial direction from the portion on which the second rolling mark 28 is formed may be the base-end-side shaft portion 26.

In a case of implementing the present invention, a method may be adopted as a modified example of an embodiment in which, from the start to the end of the cutting process, the rotation direction of the pair of rolling dies is maintained in a specified direction without reversing the rotation direction. In this case, the cutting process may be started from, for example, the position in the axial direction illustrated in FIG. 8B and end at the position in the axial direction illustrated in FIG. 8A.

As long as the rolling method of the screw shaft in the present invention is, for example, a rolling method in which walking of the work occurs during the rolling process, it is possible to adopt methods such as a through-feed rolling method as described in JP 2003-033841A, a flat-plate rolling method, or the like.

In the through-feed rolling method, for example, a pair of rolling dies (round dies), the central axes of which are inclined with respect to each other, are used in order to generate walking of the work. While keeping the distance between the pair of rolling dies constant, the work is supplied from the axial direction between the pair of rolling dies while rotating the pair of rolling dies in the same direction. A rolling process is performed on the work while the work is passed in the axial direction between the pair of rolling dies by walking between the pair of rolling dies. In the present invention, in this process, a pair of rolling dies is used to perform a rolling process for forming a male-side screw portion on the outer circumferential surface of a large-diameter shaft portion for rolling, while at the same time, forms a helical first rolling mark on the outer circumferential surface of a first small-diameter shaft portion for rolling; and the pair of rolling dies is used to perform a rolling process for forming the male-side screw portion on the outer circumferential surface of the large-diameter shaft portion for rolling, while at the same time, forms a helical second rolling mark on the outer circumferential surface of a second small-diameter shaft portion for rolling.

In the through-feed rolling method, the work passes between a pair of rolling dies in the axial direction, so preferably work is used that does not have a portion further on one side in the axial direction than the first small-diameter shaft portion for rolling having an outer diameter larger than that of the first small-diameter shaft portion for rolling, and does not have a portion further on the other side in the axial direction than the second small-diameter shaft portion for rolling having an outer diameter larger than that of the second small-diameter shaft portion for rolling. However, as in the case of the work 31 of an example of an embodiment of the present invention, for example, even when the base-end-side shaft portion 26 having a larger outer diameter than the second small-diameter shaft portion for rolling 34 is present further on the other side in the axial direction than the second small-diameter shaft portion for rolling 34, in a case where the dimension L in the axial direction of the second small-diameter shaft portion for rolling 34 is sufficiently larger than the dimension in the axial direction of each of the pair of rolling dies, by supplying the work 31 from one side in the axial direction between the pair of rolling dies, it is possible to form the male-side screw portion by through-feed rolling while avoiding interference between the pair of rolling dies and the base-end-side shaft portion 26.

In the flat plate rolling method, for example, a pair of rolling dies, each of which has a flat plate shape, is used. The side surfaces of the pair of rolling dies face each other, and the side surfaces have rolling teeth. The work is supplied between the side surfaces while moving the pair of rolling dies relative to each other in directions parallel to the side surfaces facing each other. By rolling the work between the side surfaces, a rolling process is performed on the work while generating walking of the work. In the present invention, in this process, a pair of rolling dies is used to perform a rolling process for forming a male-side screw portion on the outer circumferential surface of a large-diameter shaft portion for rolling, while at the same time, forms a helical first rolling mark on the outer circumferential surface of a first small-diameter shaft portion for rolling; and the pair of rolling dies is used to perform a rolling process for forming the male-side screw portion on the outer circumferential surface of the large-diameter shaft portion for rolling, while at the same time, forms a helical second rolling mark on the outer circumferential surface of a second small-diameter shaft portion for rolling.

In a case where rolling is performed on the work 1 of one example of an embodiment of the present invention using the flat plate rolling method, for example, the rolling process may be started from the positional relation between the work 31 and the pair of rolling dies illustrated in FIG. 8B, and the rolling process may be ended at the positional relation between the work 31 and the pair of rolling dies illustrated in FIG. 8A.

In a case of implementing the method for manufacturing a screw shaft of the present invention, the number of rolling dies used for rolling may also be three or more.

The present invention can be applied not only to a screw shaft of a slide screw type feed screw mechanism but also to a screw shaft of a ball screw type feed screw mechanism. In this case, the male-side screw portion of the screw shaft becomes a male screw groove. Note that in a case where the present invention is applied to a screw shaft of a ball screw type feed screw mechanism, neither the first rolling mark nor the second rolling mark of the screw shaft is used as a male-side screw portion for engaging with a plurality of balls.

The electric position adjusting device for a steering wheel of the present invention may be applied to various conventionally known devices having various structures (devices in which at least one of the front-rear position and the up-down position of the steering wheel may be adjusted) such as described in JP 2005-199760A, JP 2006-321484A, JP 2015-227166A and the like.

The feed screw mechanism provided with the screw shaft of the present invention is not limited to being incorporated in an electric position adjusting device for a steering wheel, but may also be incorporated in various mechanical devices such as the steering wheel of an automobile, the electric storage device of a headlight, a table moving device of a machine tool, and the like.

REFERENCE SIGNS LIST

1 Work
2 Rolling die
3 Male-side screw portion
4 Steering column
5 Steering shaft
6 Electric actuator
7 Outer column
8 Inner column
9 Inner shaft
10 Outer tube 11 Bearing
12 Steering wheel
13 Housing
14 Feed screw mechanism
15 Nut
16 Rod
17 Female-side screw portion
18 Worm reducer
19 Female-side screw portion
20 Arm portion
21 Screw shaft
22 Extension shaft
23 Large-diameter shaft portion
24 First small-diameter shaft portion
25 Second small-diameter shaft portion
26 Base-end-side shaft portion
27 First rolling mark
28 Second rolling mark
29 Flange portion
30 Insertion portion
31 Work
32 Large-diameter shaft portion
33 First small-diameter shaft portion for rolling
34 Second small-diameter shaft portion for rolling
Rolling die
36 Rolling teeth
37 Contact member

The invention claimed is:

1. A screw shaft, comprising:
a large-diameter shaft portion, and a small-diameter shaft portion;
the large-diameter shaft portion having a male-side screw portion over an entire length of an outer circumferential surface thereof; and
the small-diameter shaft portion being arranged adjacent in an axial direction to the large-diameter shaft portion, having an outer diameter that is smaller than an outer diameter of the large-diameter shaft portion, and having a helical rolling mark on an outer circumferential surface thereof that is in phase with an extension line of a spiral curve that is a root circle line of the male-side screw portion, wherein
the male-side screw portion comprises a completely threaded portion having a specified thread height, and incompletely threaded portions not reaching the specified thread height arranged at edge portions on both ends in the axial direction of the male-side screw portion, and
the entire male-side screw portion functions as a normal threaded portion and only the rolling mark corresponds to a non-threaded portion that does not function as the normal threaded portion.

2. The screw shaft according to claim 1, wherein
the outer diameter of the small-diameter shaft portion is no less than 0.9 times and no more than 1.1 times the root circle diameter of the male-side screw portion.

3. The screw shaft according to claim 1, comprising
an adjacent shaft portion that is arranged adjacent to the small-diameter shaft portion on a side in the axial direction opposite to the large-diameter shaft portion, and that has an outer diameter larger than the outer diameter of the small-diameter shaft portion.

4. The screw shaft according to claim 1, wherein
the small-diameter shaft portion comprises: a first small-diameter shaft portion arranged on one side in the axial direction of the large-diameter shaft portion; and a second small-diameter shaft portion arranged on the other side in the axial direction of the large-diameter shaft portion.

5. The screw shaft according to claim 4, wherein
both an outer diameter of the first small-diameter shaft portion and an outer diameter of the second small-diameter shaft portion are no less than 0.9 times and no more than 1.1 times the root circle diameter of the male-side screw portion.

6. The screw shaft according to claim 5, wherein
the screw shaft may be incorporated in an electric position adjusting device for a steering wheel.

7. The screw shaft according to claim 4, wherein
the screw shaft may be incorporated in an electric position adjusting device for a steering wheel.

8. A method for manufacturing a screw shaft, comprising:
a step of performing a rolling process on a work comprising a large-diameter shaft portion for rolling, and a small-diameter shaft portion for rolling arranged adjacent in an axial direction to the large-diameter shaft portion for rolling, and having an outer diameter that is smaller than an outer diameter of the large-diameter shaft portion for rolling; wherein the rolling process generates walking of the work using a plurality of rolling dies in order to form a male-side screw portion over an entire length in the axial direction of an outer circumferential surface of the large-diameter shaft portion for rolling; and
in the process of performing the rolling process on the work, a helical rolling mark is formed on an outer circumferential surface of the small-diameter shaft portion for rolling using the rolling dies, while at the same time performing the rolling process for forming the male-side screw portion on the outer circumferential surface of the large-diameter shaft portion for rolling, wherein
the male-side screw portion comprises a completely threaded portion having a specified thread height, and incompletely threaded portions not reaching the specified thread height arranged at edge portions on both ends in the axial direction of the male-side screw portion, and
the entire male-side screw portion functions as a normal threaded portion and only the rolling mark corresponds to a non-threaded portion that does not function as the normal threaded portion.

9. The method for manufacturing a screw shaft according to claim 8, wherein
an outer diameter of the small-diameter shaft portion for rolling is no less than 0.9 times and no more than 1.1 times a root circle diameter of a male-side screw portion to be formed on an outer circumferential surface of the large-diameter shaft portion for rolling.

10. The method for manufacturing a screw shaft according to claim 8, wherein
the work comprises an adjacent shaft portion that is arranged adjacent to the small-diameter shaft portion for rolling on the opposite side in the axial direction to the large-diameter shaft portion for rolling, and that has an outer diameter larger than an outer diameter of the small-diameter shaft portion for rolling.

11. The method for manufacturing a screw shaft according to claim 8, wherein
the work is configured such that the small-diameter shaft portion for rolling of which comprises a first small-diameter shaft portion for rolling arranged on one side in the axial direction of the large-diameter shaft portion for rolling, and a second small-diameter shaft portion for rolling arranged on the other side in the axial direction of the large-diameter shaft portion for rolling.

12. The method for manufacturing a screw shaft according to claim 11, wherein
both an outer diameter of the first small-diameter shaft portion and an outer diameter of the second small-diameter shaft portion are no less than 0.9 times and no more than 1.1 times the root circle diameter of the male-side screw portion.

13. The method for manufacturing a screw shaft according to claim 11, wherein
a screw shaft incorporated in an electric position adjusting device for a steering wheel is applied as the screw shaft.

14. A feed screw mechanism comprising:
a screw shaft, having:
a large-diameter shaft portion, and
a small-diameter shaft portion;
the large-diameter shaft portion having a male-side screw portion over an entire length of an outer circumferential surface thereof; and
the small-diameter shaft portion being arranged adjacent in an axial direction to the large-diameter shaft portion, having an outer diameter that is smaller than an outer diameter of the large-diameter shaft portion, and having a helical rolling mark on an outer circumferential surface thereof that is in phase with an extension line of a spiral curve that is a root circle line of the male-side screw portion; and
a nut having a female-side screw portion on an inner circumferential surface that engages with the male-side screw portion, and
a part in the axial direction of the female-side screw portion capable of being arranged at a position in the axial direction deviated from the male-side screw portion, wherein
the rolling mark does not engage with the female-side screw portion of the nut.

15. An electric position adjusting device for a steering wheel comprising:
an electric motor, a feed screw mechanism and a steering component; wherein
the feed screw mechanism includes a screw shaft having a male-side screw portion on an outer circumferential surface thereof and a nut having a female-side screw portion on an inner circumferential surface that engages with the male-side screw portion; and is configured so that the screw shaft and the nut are able to move relative to each other in an axial direction based on relative rotation of the screw shaft and the nut due to a rotation force transmitted from the electric motor;
the steering component is such that when used, a steering wheel is fixed thereto, and as the screw shaft and the nut displace relative to each other in the axial direction, the steering component is able to displace in a position adjusting direction of the steering wheel; and
the screw shaft is configured by the screw shaft according to claim 6.

16. The electric position adjusting device for a steering wheel according to claim 15, wherein
in a state in which the steering wheel is displaced to an end portion of a position adjustment range, a part in the axial direction of the female-side screw portion may be arranged at a position in the axial direction deviated from the male-side screw portion.

17. A method for manufacturing an electric position adjusting device for a steering wheel,
the electric position adjusting device for a steering wheel comprising an electric motor, a feed screw mechanism, and a steering component; wherein the feed screw mechanism includes a screw shaft having a male-side screw portion on an outer circumferential surface thereof and a nut having a female-side screw portion on an inner circumferential surface that engages with the male-side screw portion; and is configured so that the screw shaft and the nut are able to move relative to each other in an axial direction based on relative rotation of the screw shaft and the nut due to a rotation force transmitted from the electric motor;
the method comprising a step of manufacturing the screw shaft by performing a rolling process on a work comprising: a large-diameter shaft portion for rolling; a first small-diameter shaft portion for rolling arranged on one side in the axial direction of the large-diameter shaft portion for rolling and having an outer diameter that is smaller than the outer diameter of the large-diameter shaft portion for rolling; and a second small-diameter shaft portion for rolling arranged on the other side in the axial direction of the large-diameter shaft portion for rolling and having an outer diameter that is smaller than the outer diameter of the large-diameter shaft portion for rolling; wherein the rolling process generates walking of the work using a plurality of rolling dies in order to form a male-side screw portion over an entire length in the axial direction of an outer circumferential surface of the large-diameter shaft portion for rolling,
wherein the method for manufacturing a screw shaft according to claim 13 is adopted in the step of manufacturing the screw shaft.

\* \* \* \* \*